United States Patent
Frauenhofer et al.

(10) Patent No.: US 6,236,991 B1
(45) Date of Patent: May 22, 2001

(54) METHOD AND SYSTEM FOR PROVIDING ACCESS FOR CATEGORIZED INFORMATION FROM ONLINE INTERNET AND INTRANET SOURCES

(75) Inventors: Thomas Valentine Frauenhofer, Stony Point, NY (US); Joaquin Manuel Marques, Greenwich, CT (US); Michael Edward Moran, Ridgewood, NJ (US); Subhas Palchowdhury, Mahopac, NY (US); Jeffrey Stephen Schaffer, Ridgefield, CT (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/979,861

(22) Filed: Nov. 26, 1997

(51) Int. Cl.[7] ................................................. G06F 17/30
(52) U.S. Cl. .................................. 707/6; 707/4; 707/10; 705/10; 705/27
(58) Field of Search .............................. 707/6, 7, 10, 104, 707/500, 513, 515, 516, 531, 4; 395/200.57, 200.48, 200.49, 200.59, 200.3

(56) References Cited

U.S. PATENT DOCUMENTS

| | | | | |
|---|---|---|---|---|
| 5,659,732 | * | 8/1997 | Kirsch | 707/10 |
| 5,706,507 | * | 1/1998 | Schloss | 707/104 |
| 5,740,549 | * | 4/1998 | Reilly et al. | 705/14 |
| 5,754,939 | * | 5/1998 | Herz et al. | 707/10 |
| 5,761,662 | * | 6/1998 | Dasan | 707/10 |
| 5,774,652 | * | 6/1998 | Smith | 395/186 |
| 5,778,367 | * | 7/1998 | Wesinger, Jr. et al. | 707/10 |
| 5,790,664 | * | 8/1998 | Coley et al. | 380/4 |
| 5,815,665 | * | 9/1998 | Teper et al. | 395/200.59 |
| 5,819,284 | * | 10/1998 | Farber et al. | 707/104 |
| 5,826,014 | * | 10/1998 | Coley et al. | 395/187.01 |
| 5,835,087 | * | 11/1998 | Herz et al. | 345/327 |
| 5,835,905 | * | 11/1998 | Pirolli et al. | 707/3 |
| 5,862,339 | * | 1/1999 | Bonnaure et al. | 395/200.57 |
| 5,870,550 | * | 2/1999 | Wesinger, Jr. et al. | 395/200.48 |
| 5,881,234 | * | 3/1999 | Schwob | 395/200.49 |
| 5,887,133 | * | 3/1999 | Brown et al. | 395/200.3 |
| 5,895,470 | * | 4/1999 | Pirolli et al. | 707/102 |
| 5,924,090 | * | 7/1999 | Krellenstein | 707/5 |
| 5,931,907 | * | 8/1999 | Davies et al. | 709/218 |
| 5,943,670 | * | 8/1999 | Prager | 707/5 |
| 5,987,454 | * | 11/1999 | Hobbs | 707/4 |

* cited by examiner

*Primary Examiner*—Thomas Black
*Assistant Examiner*—Frantz Coby
(74) *Attorney, Agent, or Firm*—David M. Shofi; Anne Vachon Dougherty

(57) ABSTRACT

A system for collecting, categorizing and searching metadata about content provided on the internet and/or intranet for delivery in accordance with customized user profiles. The system collects internet information and categorizes same for provision at a customer's intranet server. The system is additionally adapted to either passively receive or actively collect and categorize internally-provided content for delivery with the externally gathered and categorized content and for matching to user profiles.

22 Claims, 2 Drawing Sheets

METHOD AND SYSTEM FOR PROVIDING ACCESS FOR CATEGORIZED INFORMATION FROM ONLINE INTERNET AND INTRANET SOURCES

FIELD OF THE INVENTION

This invention relates to the field of electronic content provision. More specifically, it relates to gathering related content from internet and intranet sources and providing access to same in response to user requests.

BACKGROUND OF THE INVENTION

A huge quantity of information is being continuously created and made available via electronic communications systems. There is so much information that it is simply not possible for an individual person to read it all. On the other hand, it is imperative that certain items of information reach certain people. Much of the electronically-provided news information ages rapidly, such that it loses its relevancy in a matter of days, or even a matter of hours (e.g., stock market information). Each person has different needs for information, and requires access to a different subset of the available information. In light of the foregoing, there is clearly a need for a system and method for rapidly accessing categorized electronic information.

One difficulty in providing the information is that the information is being created in many different places. News articles about events in the world or business community, and articles written for newspapers, magazines and journals, can generally be obtained through various content providers, who frequently aggregate the information from a number of sources into single continuous electronic streams. No content provider today, however, provides access to all available information, so there is a trade-off between full access and complexity. Moreover, an individual user is forced to subscribe to a host of services in order to obtain the information which is generated from different sources, in different countries, and in various languages. Subscribing to many services to some extent negates the benefits realized by the content aggregation by providers, since the user must then filter through multiple copies of the same documents.

Internally, organizations face similar issues. Memos, announcements, documents of various kinds, and intranet web content are created at multiple locations throughout an organization, yet are generally not readily available to all members of the organization. Therefore, the process of collecting the information from all points of origins is a key issue, along with categorization and controlled dissemination of that information.

Another aspect of the problem is the actual matching process, comprising matching the collected and categorized content with an individual user's interests. For matching to work, an individual user must be able to express a diverse set of interests, not just one interest. A language of some kind is necessary to provide a medium for this expression of the user's interest. Further, a system is needed to capture the language and apply it to the items of information. Moreover, the language must embody some kind of high level semantic knowledge, since past word-search-based systems have fallen short of a satisfactory solution. The ability to express, capture and apply a person's interests or needs is a critical feature of the problem.

Finally, there is a need to deliver the information to people who have expressed an interest. The primary requisites for delivery are making sure that access to the information is convenient, even in dynamic situations, and making sure that delivery can occur quickly once the information becomes available. Moreover, people are increasingly mobile and have varied styles of working and of accessing and processing information. An effective delivery system will therefore require that the means of access be ubiquitous, that multiple means of access be available, and that delays in making the information available be minimized.

It is therefore an objective of the present invention to provide a system for gathering, categorizing, and delivering electronic content to users in response to user requests.

It is another objective of the invention to provide a system and method for gathering content from both inside (i.e., intranet) and outside (i.e., internet) sources and categorizing same for provision in response to customized user requests.

Yet another objective of the present invention is to provide a customer with the ability to embed user interest and delivery mechanisms into customer applications.

SUMMARY OF THE INVENTION

These and other objectives are realized by the present invention which provides a system for collecting and categorizing metadata about content provided via the internet or intranet; for gathering user interest information and creating a user profile for matching to collected and categorized content information; and for matching and delivering categorized information tailored to customized user profiles.

BRIEF DESCRIPTION OF THE DRAWINGS

The invention will now be further detailed with specific reference to the appended figures wherein.

DESCRIPTION OF THE PREFERRED EMBODIMENT

Figure 1:
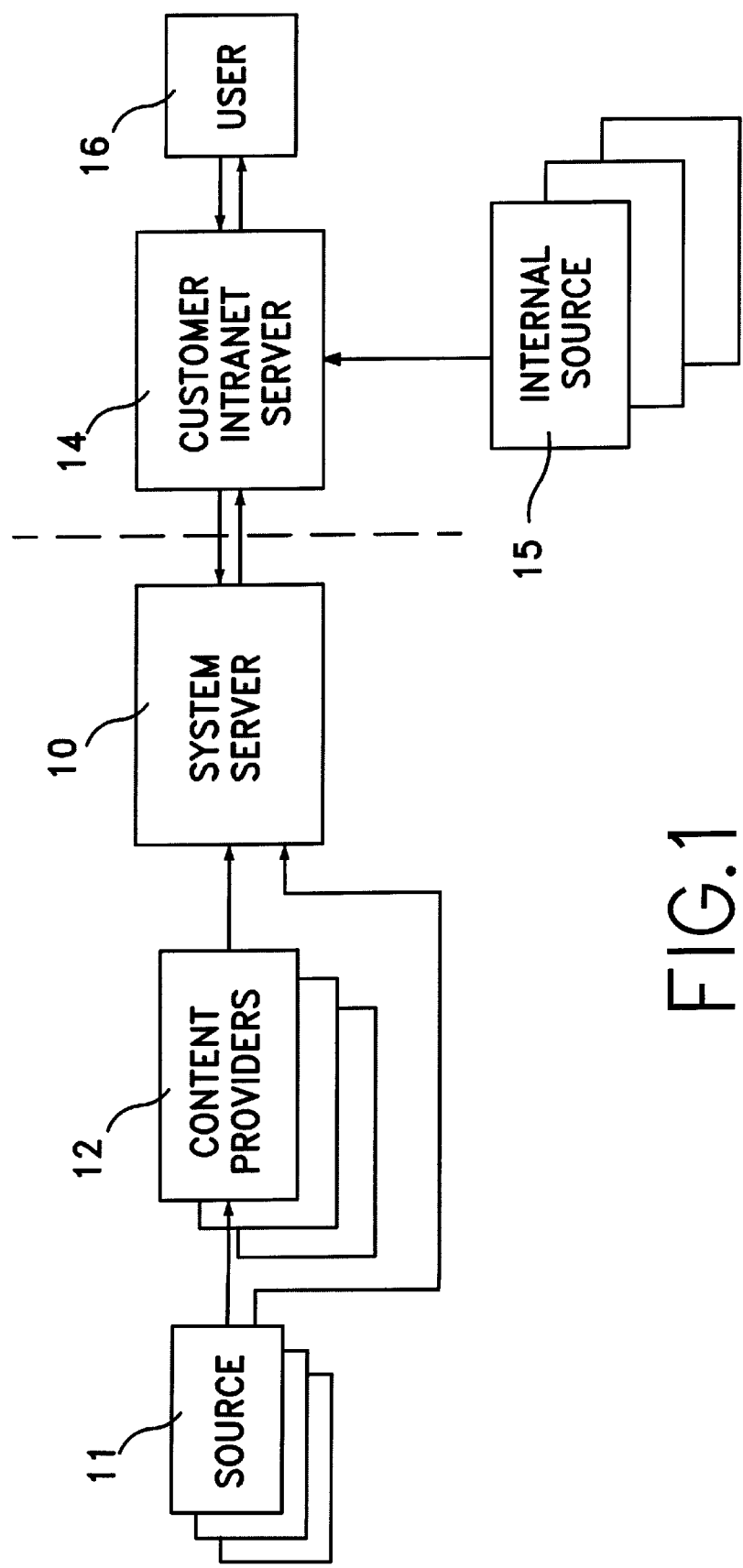
FIG. 1 provides a schematic illustration of an implementation of the present invention.

FIG. 1 provides a schematic overview of one implementation of the present invention. The implementation can be viewed as having two sides, an external side comprising the sources, content providers and System Server, and an internal side comprising the customer's site (including at least one server for the customer's intranet), internal sources and end user sites. As detailed therein, sources 11 provide electronic content (e.g., articles) on-line to content providers 12. The System Server, 10, gathers electronic content from content providers, as well as directly from sources, if necessary. At the System Server, the electronic content is categorized, with duplicate copies eliminated, and is stored in so-called "channels" of information. Each channel represents a particular category or group of categories of related information. The categorization of document content is generally done without reference to known user profiles or prejudices, although the categorization can be influenced by known or expected user query categories.

On the so-called "internal" side of the inventive system, the Customer Intranet Server 14, is in communication with not only the outside System Server, but also with internal sources 15 and at least one end user 16. The end users may be employees of the customer or clients of the customer who have contracted or otherwise arranged for receipt of information which has been accumulated, categorized, and disseminated from the Customer Intranet Server site 14.

An end user 16 will specify the areas of interest for which that end user wishes to obtain electronic information. Unlike prior art systems which allowed only minimal user query input, often limited to single word entries for simple word searching, the present system assembles a complex user query including the specification of multiple disparate topics of interest. The user profile is created by system components which are located at the Customer Intranet Server 14. "Creation" of the user profile involves not only the extension of user-input language, but also the elimination of non-critical language, inclusion of semantic knowledge, and cross-relating of user interest topics. Query development is further detailed below.

Once the user profile has been developed, it is stored at the Customer Intranet Server for matching to assembled and categorized content. The system can be programmed to conduct on-going matching (i.e., checking every new document entry for a match with the user profile), periodic matching (e.g., every 12 hours), or matching only upon user prompting (e.g., only when a user connects to the Customer Intranet Server and asks for an update).

Continual or periodic categorization of external electronic content is the task of the system components which can be preferably located at the System Server 10. The System Server receives input from the content providers 12, as well as possibly from the internal sources 15 via the Customer Intranet Server 14. Receipt of input from both external and internal sources can be a passive process, whereby the documents are continuously or periodically supplied to the System Server, or an active process, whereby system crawler components seek out the documents via word searching, site mapping, etc.

The inventive system preferably includes provision to the customer site of at least one internal crawler which will provide a totally automated way to bring their entire distributed network of resources into the system. The crawlers crawl through a customer's internal network and retrieve documents from various sources, distinguished by the technologies which were used to store the information.

Documents from the internal sources are assembled and categorized at the Customer Intranet Server where a Channel Map is created containing a list of web servers, directories and other targets which have been or are to be crawled. A Channel Map also can be constucted at the System Server as well. Each entry in the Channel Map may include a list of channels in which web pages and documents from the respective server and directory are to appear. Table 1 provides a sample Channel Map for a fictitious semiconductor manufacturer:

| TYPE | SERVER | DIRECTORY | CHANNELS |
| --- | --- | --- | --- |
| Web | HR | /publish/benefits/401k | 401k |
| Web | HR | /publish/jobopenings | Jobs |
| Web | Marketing | /publish/product/specs | Product Specs |
| Web | www.badco.com | /pub/productspecs | Competition Specs |
| Web | www.goodco.com | /pub/products/electrnic | Customer Products |
| PCFile | engineering | /projects/chipdesigns | Chip Designs |
| PCFile | marketing | /reports/companalysis | Competitive Anly. |
| FTP | engineering | /projects/status | Status Reports |
| Notes | engineering | /specs/chipspeed | A1200 Design |

Figure 2:
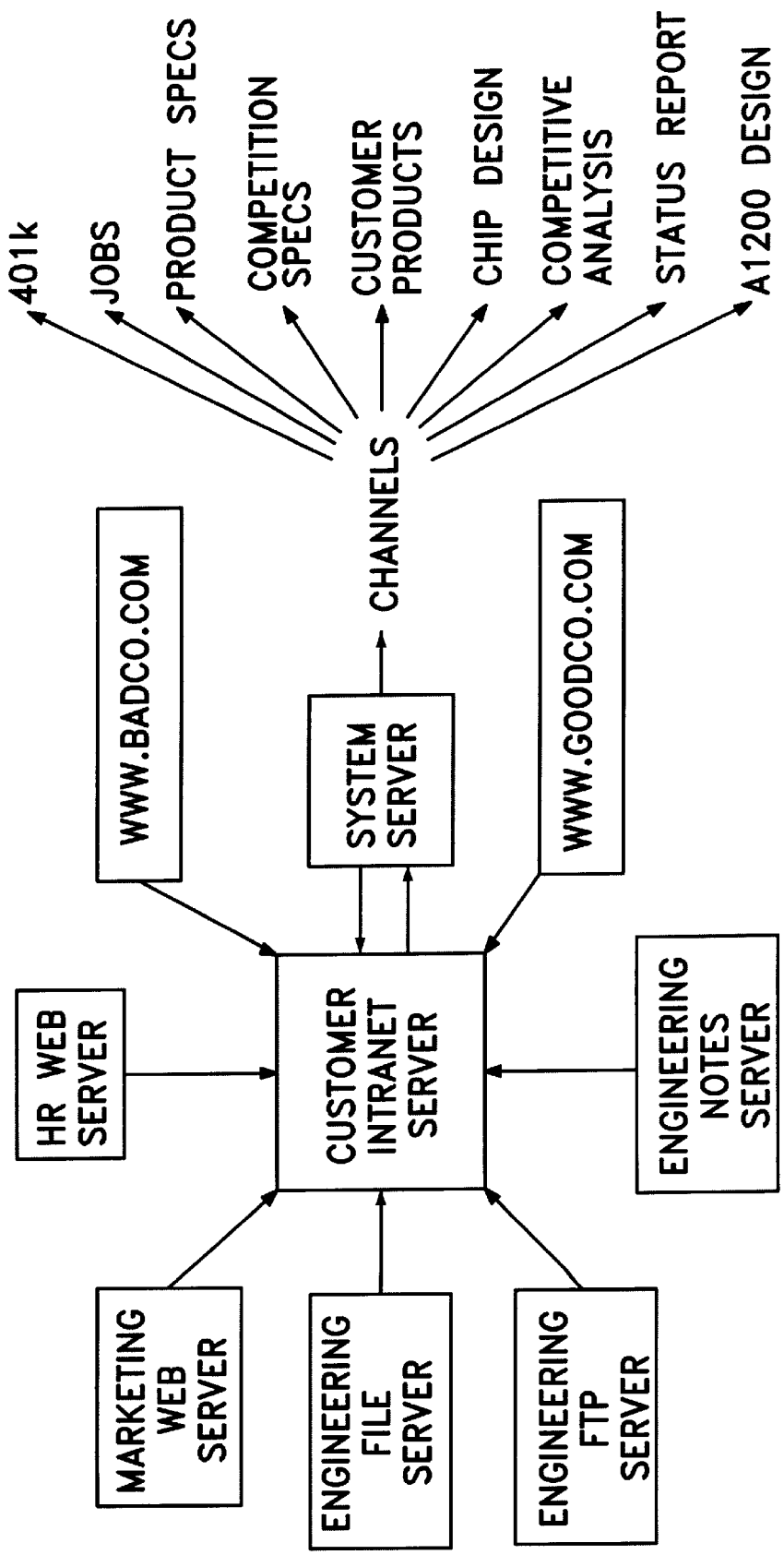
FIG. 2 provides a schematic illustration of the intranet side of one embodiment of the inventive system.

FIG. 2 provides a schematic illustration of the sources accessible to the Customer Intranet Server of the fictitious company, directly or through the System Server, and the channels that result from receiving or crawling those sources. Information gathered from external sources will also be mapped to the established channels, so that an end user can readily access all relevant information in a category or channel as the result of a single query.

While some amount of categorization may be straightforward, such as those above-noted examples wherein any information obtained from a certain source will necessarily be provided on a given channel (i.e., with sites or site directories being mapped to the channels), the bulk of document categorization requires intensive analysis of the document contents. In addition to the crawlers which automatically funnel documents obtained from certain sources into pre-established channels, there are two other primary means by which documents are categorized. The first, and most rudimentary, is categorization by manual user interface, whereby a system administrator (or even document author) identifies the document to be loaded into the server and identifies the channels in which the document is to appear. The second, more complex, means is automatic categorization by content filtering, which is conducted by system components located at either at the Customer Intranet Server, or at the System Server 10, the details of which are further provided below and in co-pending applications, Ser. No. 08/979,248, entitled "Method and System for Electronic Document Content or Query Content Filtering", and Ser. No. 08/980,075, entitled "Content Filtering for Electronic Documents Generated in Multiple Foreign Languages", which are assigned to the present assignee, and are being filed on even date herewith. Such automatic categorization can also be utilized at the Customer Intranet Server for the purpose of categorizing internal documents into channels, which may match or be unique from the channels provided by the System Server. Such channel definitions can be applied as well to documents received from the System Server to fill customer-defined channels with news or other external documents. After query processing and document content categorization, it is desirable to analyze the categories to ascertain if other relationships exist among the categories, which relationships themselves may be identified as new categories or channels. Such category processing is the subject of co-pending patent application, Ser. No. 08/978,712, entitled "Category Processing of Query Topics and Electronic Document Content Topics", which is assigned to the present assignee, and is being filed on even date herewith.

Once documents from both the internal and external sources have been categorized/assigned channels, both the documents and the assigned channels are stored in a local database at the Customer Intranet Server or associated customer location. Inventive components at the Customer Intranet Server match the channels assigned to each of the incoming documents with the user's interests as found in the user profile. Each document is then made available for access by, or is sent to, the user whose interests it matches.

The System Server's above-noted functions may be provided as part of a customer intranet, wholly outside of the customer domain, or divided in function between the two locations. In the "outside" example, all document collection and categorization would be done at the System Server as a service of the provider. Documents found on the external internet, as well as those which may be supplied from the customer's own intranet and/or databases, would be analyzed and categorized at the provider location. In the instance where the customer wishes to additionally be a provider to end users, two alternative scenarios are possible. Under the first scenario, an outside provider would still assemble and categorize documents from outside sources and make them available at the customer's server. The customer's server would also be adapted to perform assembly and categorization of "in-house" documents, merging of the in-house assemblage with the categorized documents from outside sources, matching the resultant merged documents to user request profiles, and disseminating the matching results to the user. The second alternative implementation would locate all categorization functionality at the customer location. In all three implementations, the customer location would retain the capability for receipt of user request input, creation and storage of the user profile, matching of the user profile to the categories or channels into which the documents are placed, and provision of the matched documents for end user review.

The customer site is provided with the capability for building applications to create a series of different user interfaces with different interaction means, different restrictions for user access (e.g., providing some users access to only documents from outside sources, while others would have access to both externally-obtained and internally-generated documents), and different levels of query and content complexity.

For the following detailed description of one refinement of one of the processing "stages," including user query analysis and profile creation, document categorization, and matching, it is to be noted that the same types of analyses can frequently be applied at each stage. For example, finding relationships between two seemingly disparate user query subject categories can parallel the effort to identify commonality of subject matter from two input documents, as well as a subsequent effort to match the profile to a category/channel. Therefore, where appropriate, the ensuing processes will reference one, two or all three of the stages of profile or query analysis, document content categorization, and matching stages.

Users of the system initially specify which topics are of interest. This specification may take the form of a simple subscription to pre-defined user interest categories, a modifiable subscription whereby the user may add to or otherwise edit the pre-defined categories, a completely user-customized set of queries, or a combination of any of the foregoing. Each query represents a topic, and can identify a channel and additionally contain boolean, fuzzy, proximity and/or hierarchical operators. A set of topics preferred by a user is known as a user profile. The present method reduces each query to one or more vector entries with the entry's index into the vector corresponding to a hash of the query's textual expression of the importance of that query to the overall topic/profile.

Automatic query processing, as well as document content categorization, is optimized in the present invention by first tokenizing the content thereof. In such a tokenization process, all the word/phrases are first identified as units, then stemmed (e.g., "advanc" will represent "advancement", "advancing", "advance"). After all stop words and phrases are filtered out by processes which are the subject of one of the aforementioned co-pending applications, only a few of the original word/phrases are left. These surviving words/phrases are called tokens. A query can be either a single token (word or phrase) or a combination of tokens which includes boolean, fuzzy, proximity and/or hierarchical operators. Token IDs are assigned to each query item, with the tokens usually being just the stems of the original words, or made-up labels which correspond to phrases. The stems or made-up labels are referred to as "terms". Terms are strings, and since the system must handle quite a few thousand terms, the total memory which can be consumed by terms can take up a significant amount of computer memory. Therefore, a hash function is provided to assign unique token IDs to the terms (which may also consist of expressions containing words and phrases combined with a variety of query operations). The term strings are replaced by 32 bit integers. The 32 bit integers are then used to represent positions in a vector. Each position in a vector representing a document contains a count of the number of times the term strings appeared in the query.

Textual content can likewise be mapped to vectors using the same procedures as were used for the query topics, above. Each channel definition is also represented by a vector reflecting the term strings found in documents belonging to that channel. A "reverse dictionary" can be maintained which comprises a lexicon with token IDs as the keys and the words, phrases and/or queries as the values. However, if the need is to mark the document with categories and to retrieve based on the specific tokens matched, without a need to "translate" the assigned tokens back to categories, a lexicon will not be needed.

Clearly, with the present system and method, when comparisons are being made, comparisons of 32 bit integers will be significantly faster than the prior art string comparisons. Query vectors are compared to (e.g., each vector entry is serially processed against) the channel definition vectors and/or the document vectors. Once the vectors are normalized, classification and matching are reduced to vector processing, such as the processing detailed in the aforementioned co-pending patent applications.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for a provider computer system to provide user access to electronic documents comprising the steps of:
  obtaining at least one user profile of user interests by receiving input from said user and determining query categories for said user profile from said input;
  gathering a plurality of first electronic documents from at least one electronic content source external to said provider computer location;
  receiving a plurality of second electronic documents from at least one electronic content source local to said provider computer system;
  categorizing said plurality of first electronic documents by topic categories;
  organizing said plurality of second electronic documents into topic categories;
  storing said topic categories and said first and second electronic documents at said provider computer location;
  matching each of said at least one user profiles to said topic categories; and
  retrieving said stored first and second electronic documents in topic categories matched to said at least one user profile;
  wherein said determining comprises the steps of:
    organizing said user input into a plurality of query items;
    assigning a token ID to each of said plurality of query items; and
    hashing each said token ID into a query vector.

2. The method of claim 1 further comprising correlating said query categories to known topic categories.

3. The method of claim 1 wherein said gathering of said plurality of first electronic documents comprises receiving packets of documents from external content providers.

4. The method of claim 1 wherein said gathering of said plurality of first electronic documents comprises crawling sites of said external content sources for documents.

5. The method of claim 1 wherein said receiving said plurality of second electronic documents comprises receiving packets of documents from said at least one local content source.

6. The method of claim 1 wherein said gathering of said plurality of second electronic documents comprises crawling sites of said at least one local content source for documents.

7. The method of claim 1 wherein said gathering and said receiving is done continually.

8. The method of claim 1 wherein said gathering and said receiving is done periodically.

9. The method of claim 1 wherein said gathering and said receiving is done in response to a user request.

10. The method of claim 1 wherein said organizing of said plurality of second electronic documents comprises mapping each of said second documents into topic categories based upon the location of said local electronic content source.

11. The method of claim 1 wherein said organizing of said plurality of second electronic documents comprises assigning each of said second documents to topic categories based upon manual assignment of topic categories to said documents.

12. The method of claim 1 wherein said organizing of said plurality of second electronic documents comprises assigning each of said second documents to topic categories based upon automatic content filtering.

13. The method of claim 1 wherein said categorizing of said plurality of first electronic documents comprises assigning each of said second documents to topic categories based upon manual assignment of topic categories to said documents.

14. The method of claim 1 wherein said categorizing of said plurality of first electronic documents comprises mapping each of said first documents into topic categories based upon said external electronic content source.

15. The method of claim 1 wherein said categorizing of said plurality of first electronic documents comprises assigning each of said first documents to topic categories based upon automatic content filtering.

16. A method of claim 1 wherein said first electronic documents are categorized into first topic categories, said second electronic documents are categorized into second topic categories and wherein said method further comprises merging said first and said second topic categories.

17. The method of claim 1 further comprising refining said merged topic categories based on said at least one user profile.

18. A method for a provider computer system to provide user access to electronic documents comprising the steps of:

obtaining at least one user profile of user interests;

gathering a plurality of first electronic documents from at least one electronic content source external to said provider computer location;

receiving a plurality of second electronic documents from at least one electronic content source local to said provider computer system;

categorizing said plurality of first electronic documents by topic categories;

organizing said plurality of second electronic documents into topic categories;

storing said topic categories and said first and second electronic documents at said provider computer location;

matching each of said at least one user profiles to said topic categories; and retrieving said stored first and second electronic documents in topic categories matched to said at least one user profile;

wherein said categorizing comprises the steps of:
organizing content from said first electronic documents into a plurality of items;
assigning a token ID to each of said plurality of items; and
hashing each said token ID into a document vector; and
said organizing comprises the steps of:
organizing content from said second electronic documents into a plurality of items;
assigning a token ID to each of said plurality of items; and
hashing each said token ID into a document vector.

19. The method of claim 1 wherein said categorizing comprises the steps of:

organizing content from said first electronic documents into a plurality of items;

assigning a token ID to each of said plurality of items; and hashing each said token ID into a document vector; and
said organizing comprises the steps of:
organizing content from said second electronic documents into a plurality of items;
assigning a token ID to each of said plurality of items; and
hashing each said token ID into a document vector.

20. The method of claim 19 further comprising assigning a topic token ID to each of said topic categories; and hashing each of said topic token IDs into a category vector.

21. The method of claim 20 wherein said matching comprises vector processing of query categories against said category vectors.

22. The method of claim 21 wherein said matching further comprises vector processing of query categories against document vectors.

* * * * *